(12) United States Patent
Schley-May (10) Patent No.: US 6,169,792 B1
(45) Date of Patent: *Jan. 2, 2001

(54) METHOD AND APPARATUS FOR IMPLEMENTING AUTOMATIC NUMBER IDENTIFICATION SYSTEM FOR DAA

(75) Inventor: James T. Schley-May, Nevada City, CA (US)

(73) Assignee: TDK Systems, Inc., Nevada City, CA (US)

( * ) Notice: Under 35 U.S.C. 154(b), the term of this patent shall be extended for 0 days.

This patent is subject to a terminal disclaimer.

(21) Appl. No.: 09/306,697

(22) Filed: May 6, 1999

Related U.S. Application Data (63) Continuation of application No. 08/872,376, filed on Jun. 10, 1997, now Pat. No. 5,901,210.

(51) Int. Cl.[7] .................... H04M 1/56; H04M 15/06
(52) U.S. Cl. ............ 379/142; 379/93.05; 379/183; 379/372; 379/399
(58) Field of Search ................. 379/142, 90.01, 379/93.01, 93.05, 102.02, 186, 187, 372, 376, 377, 379, 386, 387, 394, 395, 398–399, 402, 441–442

(56) References Cited

U.S. PATENT DOCUMENTS

| | | | |
|---|---|---|---|
| 5,109,409 | * 4/1992 | Bomgardner et al. | 379/377 |
| 5,133,006 | 7/1992 | Khuat | 379/399 |
| 5,633,917 | 5/1997 | Rogers | 379/74 |
| 5,659,608 | * 8/1997 | Stiefel | 379/399 |
| 5,661,794 | * 8/1997 | Rosch et al. | 379/399 |

* cited by examiner

Primary Examiner—Stella Woo
Assistant Examiner—Binh K. Tieu
(74) Attorney, Agent, or Firm—The Hecker Law Group

(57) ABSTRACT

The present invention provides apparatus and method for automatic number identification (ANI) for a data access arrangement (DAA) of a modem. Modems or telephones equipped with an ANI system use the caller ID (ANI) signals to identify the calling telephone or modem. For automatic number identification, the invention uses a new switch element on the secondary winding side of a transformer and a standard DAA circuit on the primary winding side of the transformer. The invention does not require an additional AC coupling path for the caller ID (ANI) signals. During an ANI operation, the new ANI switch on the secondary winding side is opened so that the impedance looking into the modem from the telephone line side becomes relatively high and the prior art voltage divide effect is eliminated or reduced. Consequently, the caller ID (ANI) signals that appear at the secondary winding of the transformer have virtually the same amplitudes as the caller ID (ANI) signals that appear at the telephone line with little or zero attenuation. During normal modem operations, the new ANI switch remains closed to allow signal transmissions and support impedance matching.

20 Claims, 6 Drawing Sheets

METHOD AND APPARATUS FOR IMPLEMENTING AUTOMATIC NUMBER IDENTIFICATION SYSTEM FOR DAA

This application is a continuation of U.S. application Ser. No. 08/872,376 filed Jun. 10, 1997 now U.S. Pat. No. 5,901,210.

BACKGROUND OF THE INVENTION

1. Field of the Invention

This invention relates to the field of data communication equipment (DCE), and in particular to automatic number identification system for data access arrangement (DAA).

2. Background Art

Telephone systems were originally designed for voice communication. As new technologies have emerged, methods have been devised to transmit other types of information over telephone lines. These methods typically require the connections of other equipment besides the voice telephone set to the telephone line. Examples of such equipment include computer modems, facsimile ("fax") machines, answering machines, voice mail systems, phone patches, and automatic number identification (ANI) or "Caller ID" systems.

An automatic number identification (ANI) system allows a modem or a telephone to identify the caller ID signals without user intervention. Some telephones and modems are equipped with ANI capability to provide users the convenience of ANI system. However, the prior art telephones and modems with ANI capability suffer significant ANI signal attenuation and have limited system design flexibility.

A modem enables two digital electronic systems to communicate over the telephone network. A typical telephone network comprises a single twisted pair of wires (called the "tip" and "ring" lines). Digital equipment systems, on the other hand, require two separate paths of communication to communicate with each other. Also, the signals present within the above equipment often have different electrical characteristics than the signals that may be transmitted on a telephone line. Thus, an interface is required to connect such equipment to a telephone line.

The modem is placed between the digital computer and the analog telephone system, providing the necessary interface between the telephone network and digital systems over the tip and ring lines. The modem accepts a serial stream of bits as input and produces a modulated carrier as output, thus converting the digital signals of the computer to analog signals for transmission on telephone lines, or vice versa.

To meet regional telephone companies' requirements, a modem typically comprises a DAA (Data Access Arrangement), which is used to connect to a dial-up switched telephone line. Traditionally, especially for computer modems, a DAA is used to connect equipment to a telephone line. A DAA typically provides isolation, impedance matching, hybrid circuit and sometimes amplification, filtering and control functions.

When a modem is equipped with an ANI system, it allows to identify the caller ID and register the caller ID in a memory device. If the modem is connected to a computer, then other options are possible to use the caller ID in more sophisticated ways. For example, the computer can receive the caller ID from the modem, display it on a screen, store it in its memory, or write it in a file.

An ANI system is also useful for such state-of-the-art technology as "recall." When an attempted telephone call goes unanswered, the caller ID is identified by an automatic number identification system on the called telephone and stored in a memory device such as a random access memory (RAM). When a user on the called telephone side wishes to call the last number the user missed, the user can press a special "recall" button or a combination of buttons, such as the "*" key followed by the "9" key, on the user's telephone key panel to initiate an outgoing call to the last number that called. Upon detecting a special key sequence for "recall," the user's telephone makes a "recall" to the telephone number that last called.

In an ANI system, caller ID signals are sent to a called modem or a telephone when a call is made to the called telephone number. The caller ID signals provide the called telephone or modem with identification of the calling telephone. The called telephone uses the caller ID (ANI) signals to identify the calling telephone or modem. Typical caller ID signals include frequency shift keyed (FSK) modem tones transmitted between rings of the ringing signal.

Figure 1:
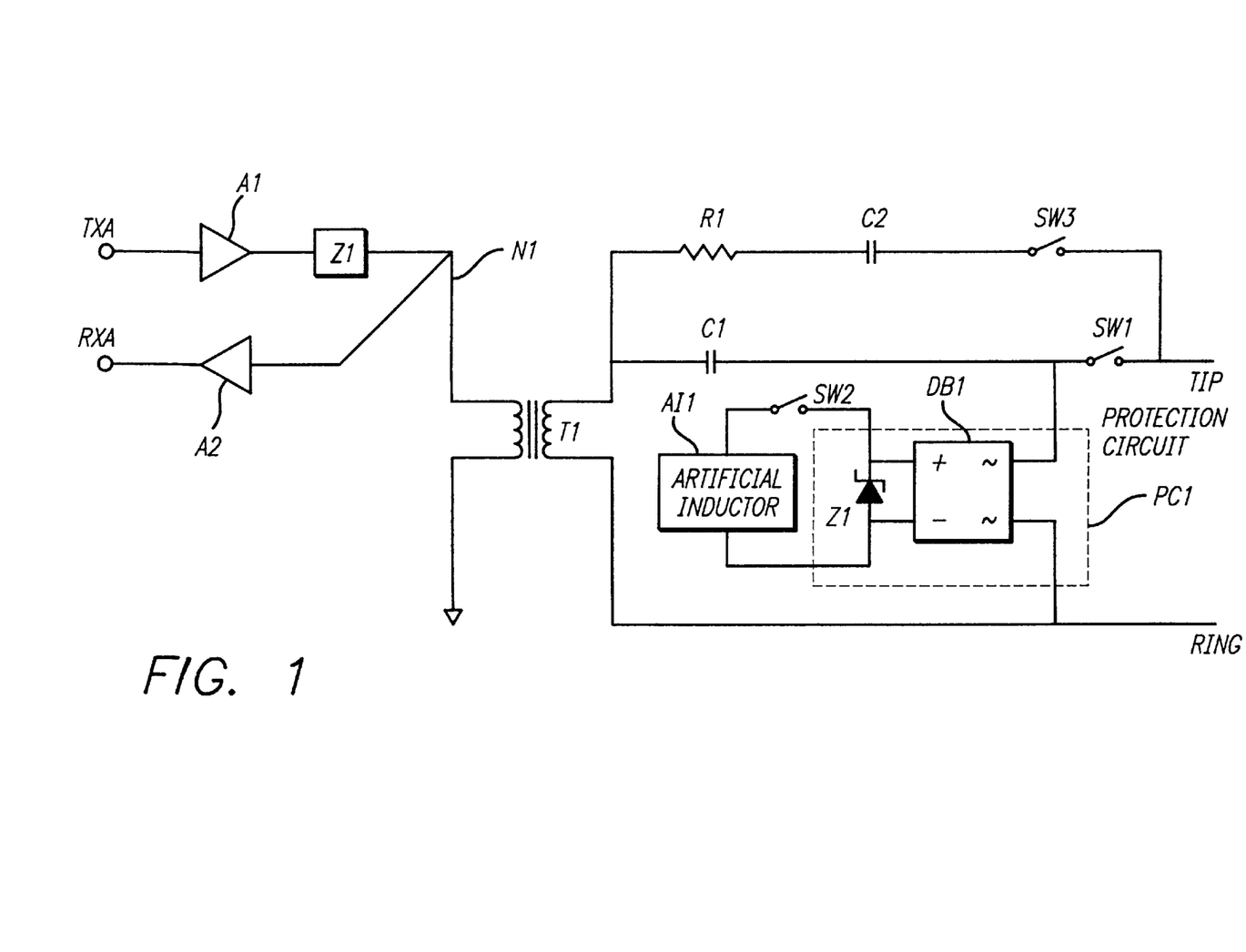
FIG. 1 is a block diagram of a prior art DAA circuit with ANI capability.

Prior art ANI systems were implemented by adding extra circuit components to DAA circuits to implement a caller ID signal path. These prior art ANI systems often led to a more complex, expensive design architecture, and resulted in significant caller ID (ANI) signal attenuation up to 18 dB or more. FIG. 1 shows a block diagram of a prior art DAA circuit for a European-compatible modem with ANI capability. The circuit in FIG. 1 has a caller ID signal path that comprises switch SW3, capacitor C2, and resistor R1. Capacitor C2 is used to block DC current from being supplied to transformer T1.

In FIG. 1, transmitted signal TXA is amplified by amplifier A1 and provided to transformer T1 through impedance network Z1. The typical value of Z1 is approximately 300 $\Omega$ for U.S. designs and 300 $\Omega$+(374 $\Omega$ resistance in parallel with 200 nf capacitance) for international designs. Received signals from the telephone line (represented by the tip and ring lines) are fed to amplifier A2 and to line RXA. Transformer T1 isolates the outgoing signal from the received signal. Transformer T1 has a primary winding and a secondary winding.

The primary winding of transformer T1 is coupled to capacitor C1, which is coupled to the "tip" line through switch SW1. Protection circuit PC1 comprising Zener diode ZD1 and diode bridge DB1 (not shown in detail, well-known in the art) is coupled across the primary winding of transformer T1 via capacitor C1. Protection circuit PC1 is used to protect the modem from voltage spikes and to ensure proper operation of a DAA circuit since the polarity of tip and ring lines are not known in advance. The primary winding of transformer T1 is also coupled to the "ring" line. The tip and ring lines (local loop) are connected to the telephone central office that provides power, switching, and signaling.

On a local loop represented by the tip and ring lines, an idle (on-hook) state is indicated by an open circuit and no current flow. A connect (off-hook) state is signaled by a closed circuit and continuous current flow. In an off-hook state, the telephone line is said to be "seized." Referring to FIG. 1, during the idle state (on-hook) before the modem has seized the line, an incoming ring signal is detected by the ring detector block (not shown, well known in the art) and switch SW3 is closed.

The caller ID signals (ANI information) are transmitted from the telephone system central office to the local DAA, and usually come between the first and second incoming rings in the form of a small AC signal. The modem can detect the caller ID signals at the RXA line if an additional AC coupling path is provided.

The additional AC coupling path for the caller ID (ANI) signals is provided in the prior art example of FIG. 1 along switch SW3, capacitor C2, and resistor R1. The existing path along switch SW1 and capacitor C1 cannot be used as the AC coupling path for the caller ID (ANI) signals since capacitor C1 by itself would exhibit an impedance below the regulated value of two (2) KΩ. Although a resistor can be used in series with capacitor C1 to increase the impedance, the addition of such series resistor would also increase the DAA's off-hook impedance value to an unacceptable range.

Referring to FIG. 1, switch SW3 is closed for the duration of an automatic number identification process, and an AC current path is formed by components R1 and C2 to allow the caller ID (ANI) signals from the telephone line to reach transformer T1 and RXA. Switches SW1 and SW2 remain open during ANI operations so that no DC current flows between the DAA and the telephone central office, thereby preventing the telephone line seizure. After an automatic number identification process is complete and the caller ID has been detected, switch SW3 is opened. In another prior art embodiment which is compatible with the U.S. and Canadian regulations but incompatible with most European regulations, switch SW3 is not required and can be replaced with a conducting wire.

In FIG. 1, capacitor C2 in the caller ID (ANI) signal path typically has a voltage rating of at least fifty (50) volts to handle the local loop voltage (typically forty eight volts) and thus is limited below a maximum capacitance value. Capacitor C2 has the typical capacitance value between 0.15 µf and 0.47 µf. Resistor R1 is used to ensure that the impedance during an ANI operation is not lower than a regulated value on the order of two (2) KΩ. Resistor R1 has the typical resistance of 2 KΩ.

A combined effect of C2 being limited in capacity and having resistor R1 is the attenuation of the caller ID (ANI) signals of more than eighteen (18) dB when the caller ID signals reach the RXA line. Consequently, the caller ID (ANI) signals that appear at node Ni are significantly attenuated and become susceptible to noise and error.

In an off-hook (connect) state, the modem closes switches SW1 and SW2, seizing the telephone line (represented by the tip and ring lines) and activating the DC portion of artificial inductor Al1. Transmitted signals that come in from the TXA line are modulated signals, i.e, carrier signals modulated by digital signals that originate from a digital data terminal equipment (DTE) such as a personal computer using a suitable modulation technique. Typical modulation techniques include amplitude, frequency, and phase modulations. Thus, signals received from the tip and ring lines are modulated signals. Transformer T1 couples these modulated carriers in both directions: from the telephone line to received signal (RXA) and from transmitted signal (TXA) to the line in the connect state. This composite AC signal comprising transmitted and received signals flows through coupling capacitor C1. Capacitor C1 has the typical capacitance value of 3 µf–5 µf.

In the off-hook (connect) state, switch SW2 is closed and suitable protections are provided by protection circuit PC1 against voltage spikes and polarity reversal. SW2 is a required component for European-compatible modems for pulse dialing. In an alternate prior art design, SW2 is not required and can be replaced by a wire, for example, for U.S. or Canadian design. During pulse dialing, SW1 is closed and SW2 is pulsed to generate dial pulses consisting of current flow interrupted at a specified rate in the loop current (between a local DAA and the central telephone office).

Zener diode ZD1 provides overvoltage protection by absorbing the voltage transients generated during the pulsing.

Figure 2:
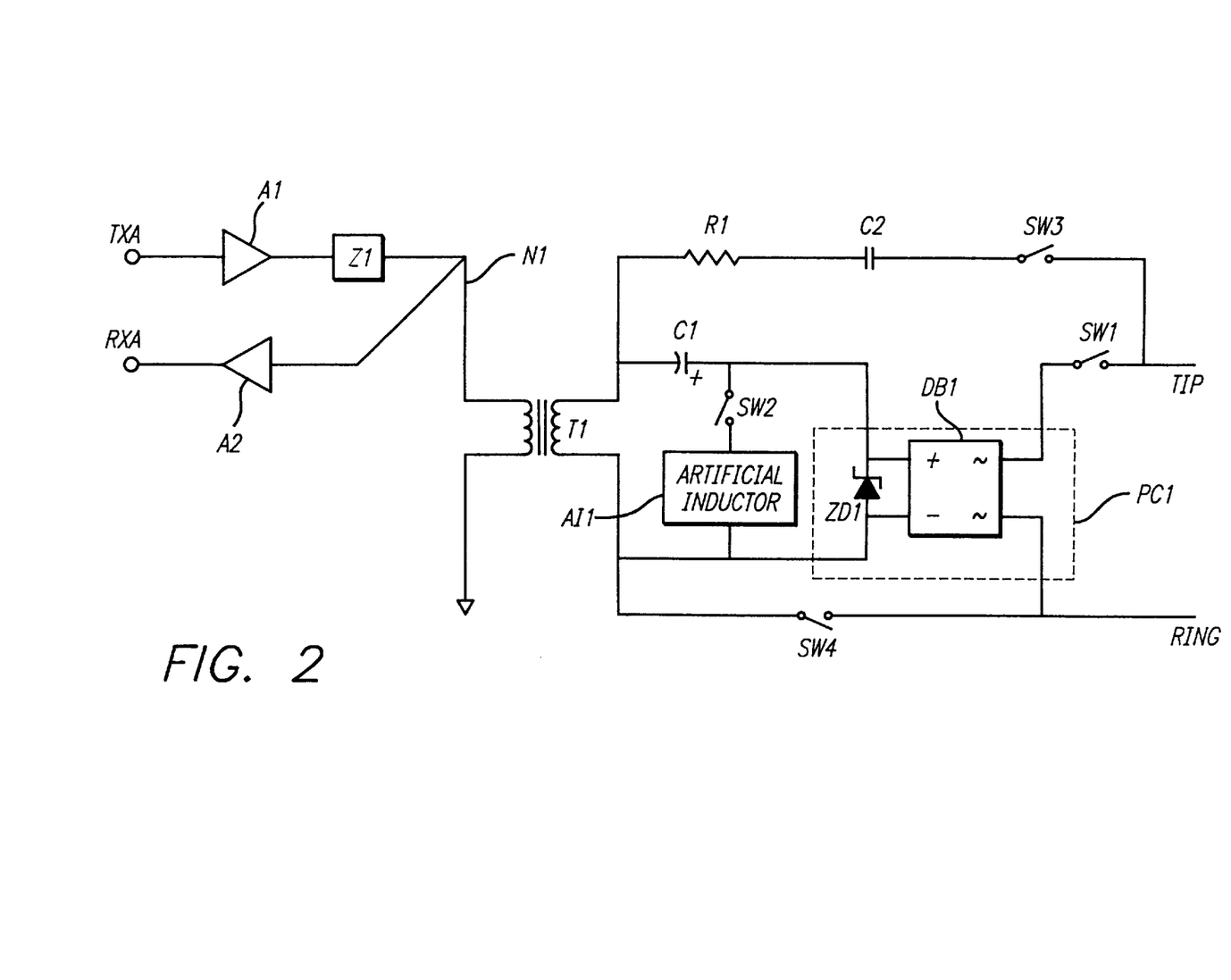
FIG. 2 is a block diagram of a prior art DAA circuit with ANI capability that uses a polarized capacitor.

FIG. 2 shows another prior art DAA system for a European-compatible modem with ANI capability. In FIG. 2, transformer T1 is coupled to the DC side ("+" and "−" terminals) of diode bridge DB1 via capacitor C1. This embodiment allows capacitor C1 to be a smaller polarized capacitor (positive plate denoted by "+" sign) as shown in FIG. 2 rather than a larger unpolarized capacitor of FIG. 1. In an ANI operation, switches SW3 and SW4 are closed to form a circuit path for the caller ID signals. The approach shown in FIG. 2, however, requires an extra switch element SW4 to return the bottom leg of the transformer to the correct node in addition to the caller ID signal path comprising resistor R1, capacitor C2, and switch SW3.

Figure 3:
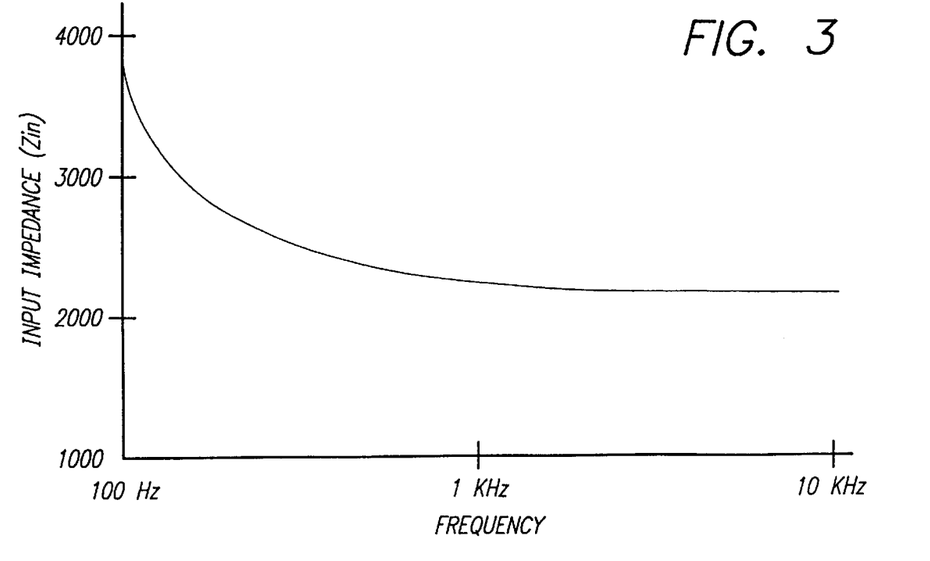
FIG. 3 shows a plot of input impedance versus ANI signal frequency for prior art DAA circuits

FIG. 3 shows a plot of input impedance versus ANI signal frequency for DAA circuits shown in FIGS. 1 and 2. In FIG. 3, input impedance Zin (assumed to be resistive) looking into the modem from the telephone line varies from about 2.3 KΩ to 3.9 KΩ depending on the signal frequency.

Figure 4:
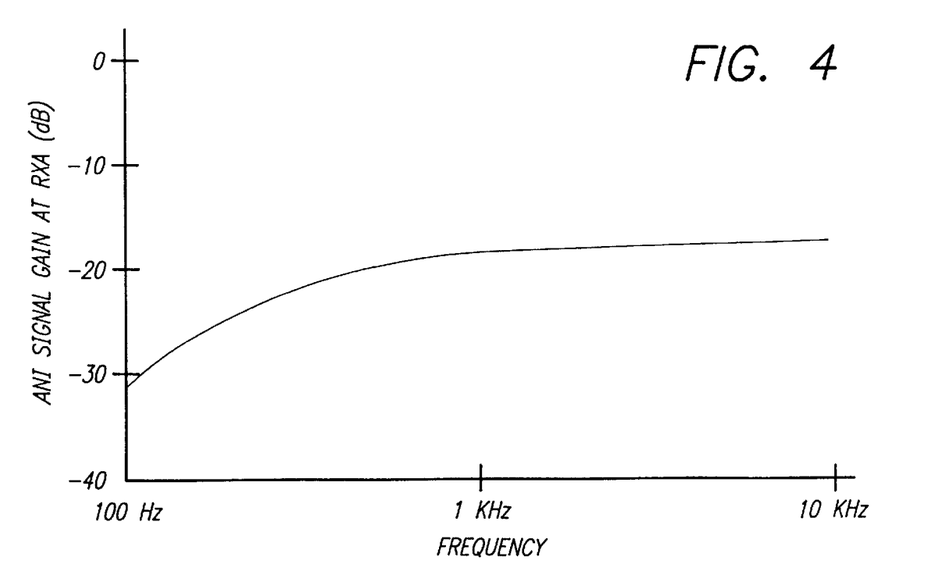
FIG. 4 shows the frequency response of ANI signal gain for prior art DAA circuits.

FIG. 4 shows the frequency response of ANI signal gain for DAA circuits shown in FIGS. 1 and 2. In FIG. 4, the vertical axis shows ANI signal gain in dB at RXA line (pin). As shown, in the prior DAA circuits, the caller ID (ANI) signals arriving at node N1 are significantly attenuated due to a voltage divider effect with Z1 on the bottom of the divider and C2+R1 (plus transformer T1's winding resistance) on the top, with node V1 at the midpoint. Typically, ANI signal attenuation in the prior art DAA circuits ranges from 18 dB to 31 dB, significantly weakening the caller ID (ANI) signals.

Thus there is a need in the art to provide a DAA with ANI capability that reduces the caller ID signal attenuation without requiring significant modifications to the existing DAA designs and without greatly increasing design complexity.

SUMMARY OF THE INVENTION

The present invention provides apparatus and method for automatic number identification (ANI) for a data access arrangement (DAA) of a modem. An ANI system allows the called telephone or modem to use the caller ID (ANI) signals to identify the calling telephone or modem. Typically, the caller ID (ANI) signals are received between the first and second ringing signals as small AC signals. For automatic number identification, the invention introduces a new switch element on the secondary winding side of a transformer. A standard DAA circuit comprising a coupling capacitor, a protection circuit, and an artificial inductor is coupled to the primary winding of the transformer and no additional AC coupling path is required on the primary winding of the transformer for the caller ID (ANI) signals.

The incoming caller ID signals are coupled across a coupling capacitor and across a transformer during an ANI operation. The new ANI switch on the secondary winding side is opened during an ANI operation so that the impedance looking into the modem from the telephone line side becomes relatively large and the prior art voltage divide effect is eliminated or reduced. Consequently, the caller ID (ANI) signals that appear at the secondary winding of the transformer have virtually the same amplitude as the caller ID (ANI) signals that appear at the telephone line with little or zero attenuation. During normal modem operations, the new ANI switch remains closed to allow the signal transmission and support impedance matching.

DETAILED DESCRIPTION OF THE INVENTION

The present invention is an automatic number identification method described with respect to DAA (Data Access Arrangement). In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

Figure 5:
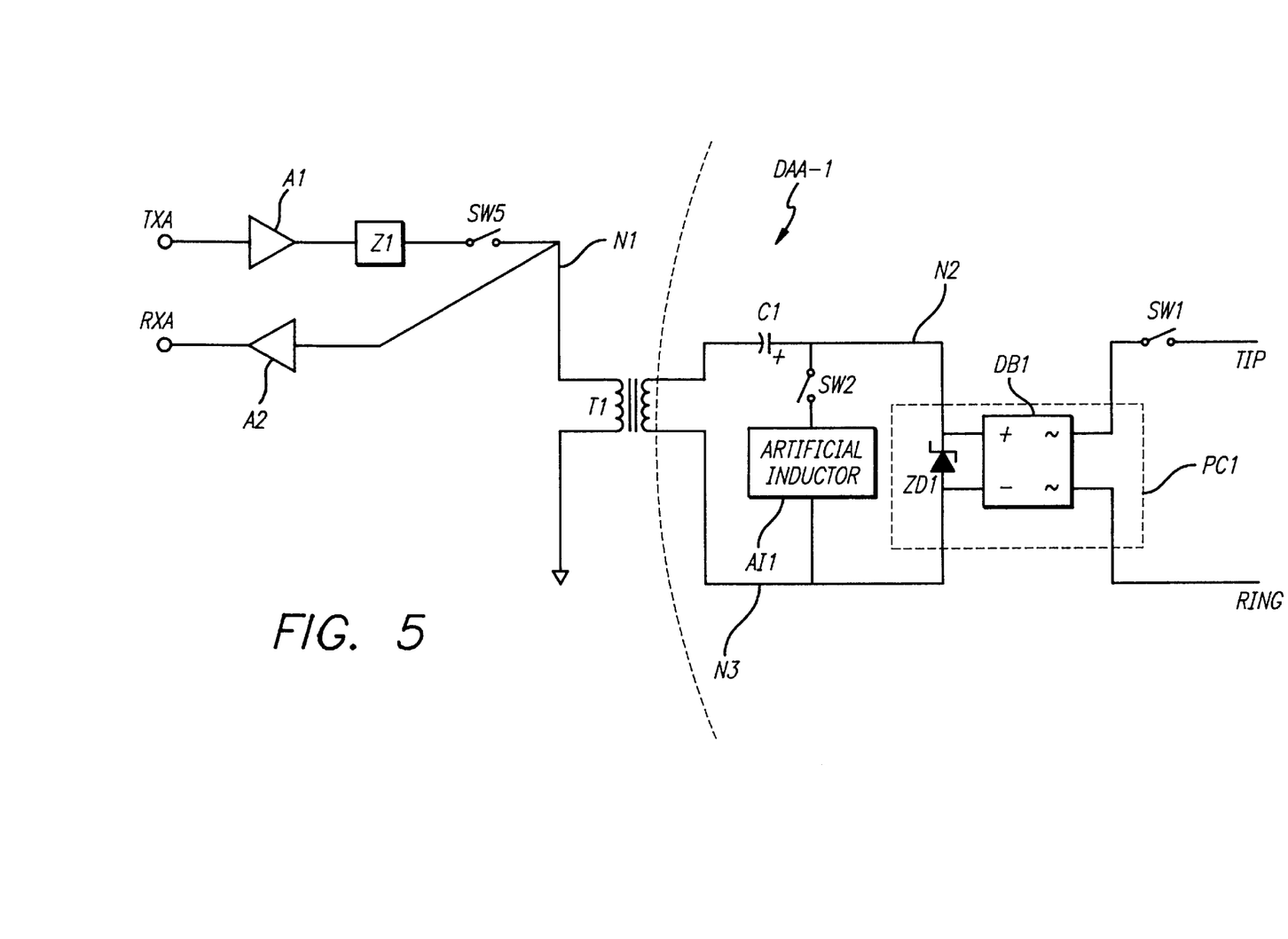
FIG. 5 is one embodiment of a DAA with ANI capability constructed in accordance with the present invention.

FIG. 5 is a block diagram of a DAA with ANI capability in one embodiment of the invention. Referring to FIG. 5, on the right side of transformer T1, conventional DAA circuit DAA-1 is shown, which does not include a separate caller ID (ANI) signal path, and accordingly does not require extra circuit components other than regular DAA circuit components. (Switches SW1 and SW2 are required components for a European compatible modem, and the conventional DAA circuit shown in FIG. 5 requires no extra capacitors or resistors).

On the left side of the transformer, switch SW5 has been added in series with existing impedance network Z1, coupled to the secondary winding of transformer T1 via node N1. Impedance network Z1 is coupled to transmit amplifier A1, which receives transmit signals from TXA line. Impedance network Z1 comprises any circuit element such as a resistor, a capacitor, an inductor, or a line impedance that contributes to the impedance between switch SW5 and transmit amplifier A1. Node N1 is also coupled to receive amplifier A2, which is coupled to RXA line.

Referring to FIG. 5, the primary (right side) winding of transformer T1 is coupled to capacitor C1, which is coupled to node N2. Switch SW2 and artificial inductor AI1 is coupled across the primary winding of transformer T1 via nodes N2 and N3. Zener diode ZD1 is coupled to capacitor C1 across nodes N2 and N3.

Zener diode ZD1 and diode bridge DB1 form protection circuit PC1. Zener diode ZD1 protects the DAA circuit against overvoltage transients caused by pulse dialing (SW2 pulsing). Diode bridge DB1 performs polarity steering.

The "tip" and "ring" lines are coupled across diode bridge DB1. Switch SW1 is disposed between diode bridge DB1 and the tip line such that the two-wire telephone line (tip and ring) is terminated in a line-matching transformer T1. Typically, transformer T1 is a 1:1 transformer which comprises a balancing network, and provides an interface between a four-wire circuit (TXA and RXA side) and a two-wire circuit (tip and ring lines). Transformer T1 allows two superimposing ac signals (transmitted and received) to be recovered separately. As shown in FIG. 5, the secondary (left side) winding of transformer T1 is coupled to both the receive section input RXA and the transmit section output TXA. The received signal has no effect on the transmit section.

Referring to FIG. 5, in normal modem operations, switches SW1, SW2 and SW5 are closed. When SW2 is closed, DC current is allowed to flow between the DAA circuit and the telephone central office, and the central office seizes the telephone line.

In the on-hook (idle) state, switches SW1 and SW2 are open. SW5 may be open or closed in the on-hook (idle) state. When an incoming ring signal is detected by the ring detector block (not shown, well known in the art), switch SW1 is closed and SW5 is opened if not already so, forming a closed AC path.

Referring to FIG. 5, SW2 remains open during an ANI operation and there is no DC current flow between the DAA circuit and the central office so as to prevent seizing the telephone line. Switch SW5 is opened during an ANI operation. With switches SW2 and SW5 open and switch SW1 closed, the incoming caller ID (ANI) signals come in along the closed path comprising the tip line, diode bridge DB1, capacitor C1, transformer T1, and the ring line from the telephone central office (coupled to the tip and ring lines, not shown). The caller ID signals (ANI information) usually come in between the first and second incoming rings in the form of a small AC signal. The caller ID (ANI) signals are coupled across capacitor C1 and across transformer T1 to the RXA line via receive amplifier A2. Since the caller ID signals are typically small AC signals riding on a forty eight (48) volts DC signal, diode bridge DB1 is forward biased and the diodes in DB1 are prevented from appearing non-linear to the caller ID signals.

Since switch SW5 is open during the automatic number identification operation, the impedance looking into the modem from the telephone line side (represented by the tip and ring lines) looks as if there is an unterminated transformer (T1), resulting in a relatively high impedance of about 10–40 KΩ depending on specific implementation. Also, because impedance Z1 is no longer terminating the secondary of the transformer, the prior art voltage divider effect (with Z1 on the bottom of the divider and C1 (plus transformer T1's winding resistance) on the top, and node N1 voltage V1 at the midpoint) no longer applies. Therefore, the caller ID signals that appear at node N1 have virtually the same amplitude as the caller ID (ANI) signals appearing on the telephone line.

Accordingly, the undesirable caller ID (ANI) signal attenuation is effectively reduced. Since there is less caller ID (ANI) signal attenuation (virtually zero attenuation), a modem that embodies the invention is able to detect the caller ID (ANI) signals in more difficult or adverse circumstances caused by, for example, noisy channels, and does not require as much amplification for the caller ID signals as in the prior art methods, allowing an easier caller ID signal recovery.

In the off-hook (connect) state, switches SW1, SW2, and SW5 are closed and artificial inductor AI1 is activated by rectifier bridge DB1 to form a DC current loop with the tip and ring lines, providing the necessary DC loop characteristics to the local loop. In the off-hook state, the modem seizes the telephone line.

Referring to FIG. 5, any suitable DC biasing circuit can be used in place of artificial inductor AI1. Other electronic components of the telephone can draw power from the loop current provided by the telephone company central office in the off-hook (connect) state when artificial inductor AI1 is activated, Some examples of artificial inductor are described in detail in the co-pending U.S. patent application Ser. No. 08/855,090 filed on May 13, 1997 entitled "Method for Implementing DC Mode Selection for Data Access Arrangement," assigned to the assignee of the present application, and incorporated herein by reference.

Referring to FIG. 5, switches SW1, SW2, and SW5 can be implemented by any suitable switch that allows control of current flow. A mechanical relay or optoelectronic relay can be used for the switches. In one embodiment of the invention, SW5 is implemented by an optoelectronic relay that allows digital controllability and offers a biasing convenience.

In another embodiment of the invention, switch SW5 is implemented by a digitally controllable optoelectronic relay which is controlled by a microprocessor or a microcontroller. Unlike switch elements SW1 and SW2 on the primary side of the transformer, there is no need to galvanically isolate switch SW5 from its control signal, which permits more freedom in choosing switch component for SW5 and minimizes the design size. For example, analog switches and discrete transistors may be used to implement switch SW5 if a suitable bias and control voltages are provided.

Further, in the embodiment shown in FIG. 5, transformer T1 is coupled to the DC side ("+" and "−" terminals) of diode bridge DB1 via capacitor C1. This configuration allows capacitor C1 to be a single polarized or non-polarized capacitor. A polarized capacitor (positive plate denoted by "+" sign in FIG. 5) requires a smaller size than non-polarized capacitors, which permits a more compact modem design.

Figure 6:
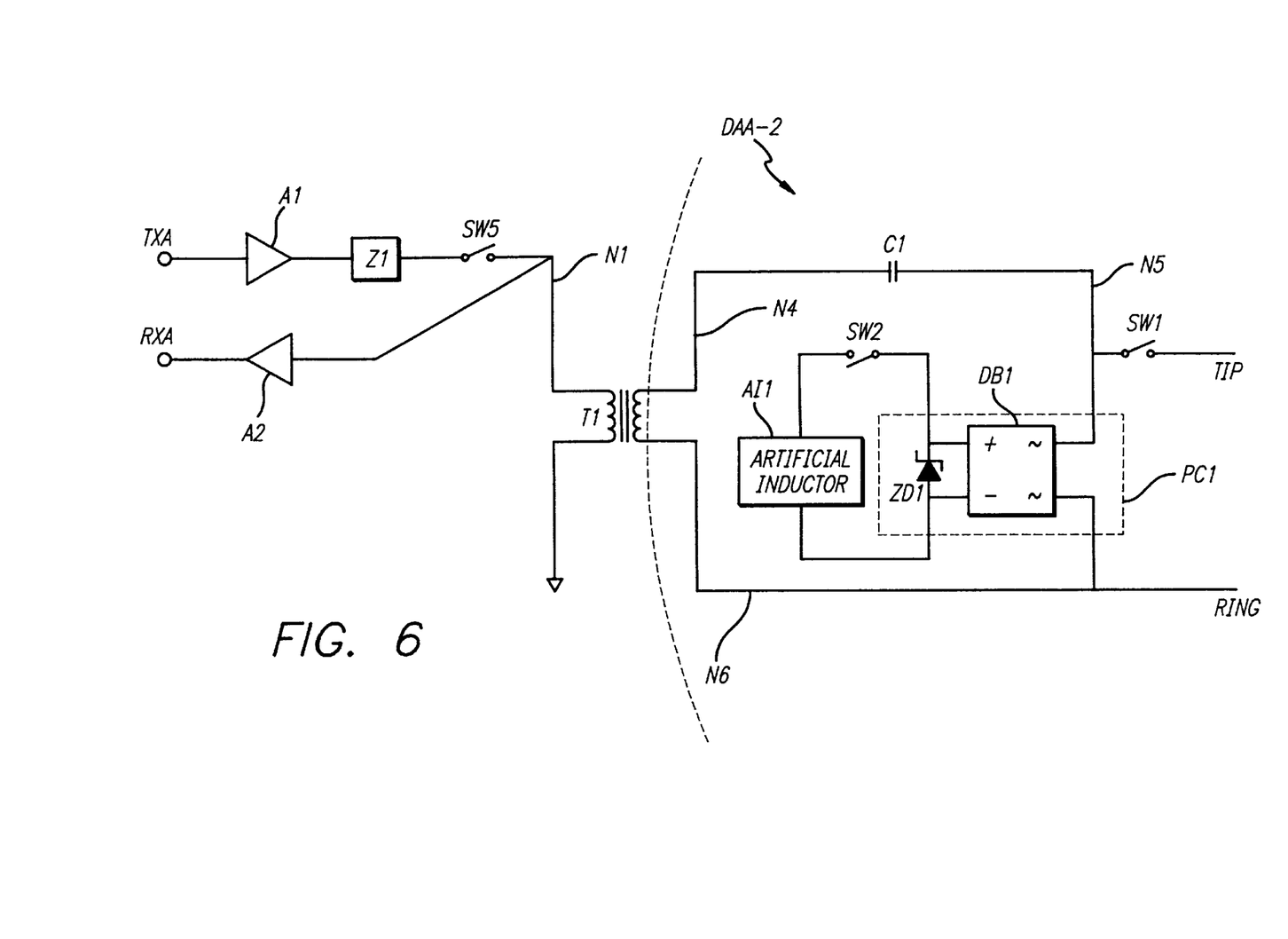
FIG. 6 is an alternate embodiment of a DAA with ANI capability constructed in accordance with the present invention.

FIG. 6 is a block diagram of a DAA with ANI capability in an alternate embodiment of the invention. Referring to FIG. 6, the right side (primary winding side) of transformer T1 uses conventional DAA circuit DAA-2. Capacitor C1 is coupled between nodes N4 and N5. Transformer T1 is coupled between nodes N4 and N6. Protection circuit PC1 is coupled between nodes N5 and N6. Node N5 is coupled to the tip line via switch SW1. Node N6 is coupled to the ring line. Protection circuit PC1 comprises diode bridge DB1 coupled between nodes N5 and N6 and Zener diode ZD1 coupled to diode bridge DB1. Switch SW2 and artificial inductor AI1 are coupled in series to Zener diode ZD1.

Referring to FIG. 6, the left side (secondary winding side) of transformer T1 is coupled to node N1, which is coupled to receive amplifier A2. Receive amplifier A2 is coupled to RXA line. Node N1 is coupled to switch SW5, to which impedance Z1 and transmit amplifier A1 are coupled in series. Transmit amplifier A1 receives transmit signals from TXA line.

The embodiment shown in FIG. 6 uses switch SW5 coupled between the secondary winding of transformer T1 and impedance network Z1. During an automatic number identification operation, switch SW1 is closed and switch SW5 is opened as discussed with respect to FIG. 5. Switch SW2 remains open during an ANI operation.

As discussed above with respect to FIG. 5, during an ANI operation, switch SW5 is opened and the impedance looking into the modem from the telephone tine side (represented by the tip and ring lines) looks as if there is an unterminated transformer (T1). Also, because impedance Z1 is no longer terminating the secondary of the transformer, the prior art voltage divider effect (with Z1 on the bottom of the divider and C1 (plus transformer T1's winding resistance) on the top, and node N1 voltage V1 at the midpoint) no longer applies. The elimination of the voltage divider effect reduces the caller ID (ANI) signal attenuation to effectively zero along the path comprising the tip line, switch SW1, capacitor C1, transformer T1, receive amplifier A2, and RXA line. Consequently, the signals that appear at node N1 have virtually the same amplitude as the caller ID (ANI) signals appearing on the telephone (tip and ring) line.

In an alternate embodiment of the invention, the position of switch SW5 and impedance network Z1 in FIGS. 5 and 6 can be exchanged so that SW5 is disposed between amplifier A1 and impedance network Z1. In yet another embodiment, switch SW5 and amplifier A1 may be combined and replaced with an amplifier with a shutdown mode. The amplifier with a shutdown mode exhibits a high impedance characteristic in the shutdown mode such that it effectively creates an open path. When a shutdown-mode amplifier is used in place of amplifier A1 and switch SW5, the operation of the invention remains the same as discussed above but switch SW5. In this embodiment, instead of opening and closing switch SW5, the shutdown-mode amplifier is driven into and out of a shutdown mode.

Figure 7:
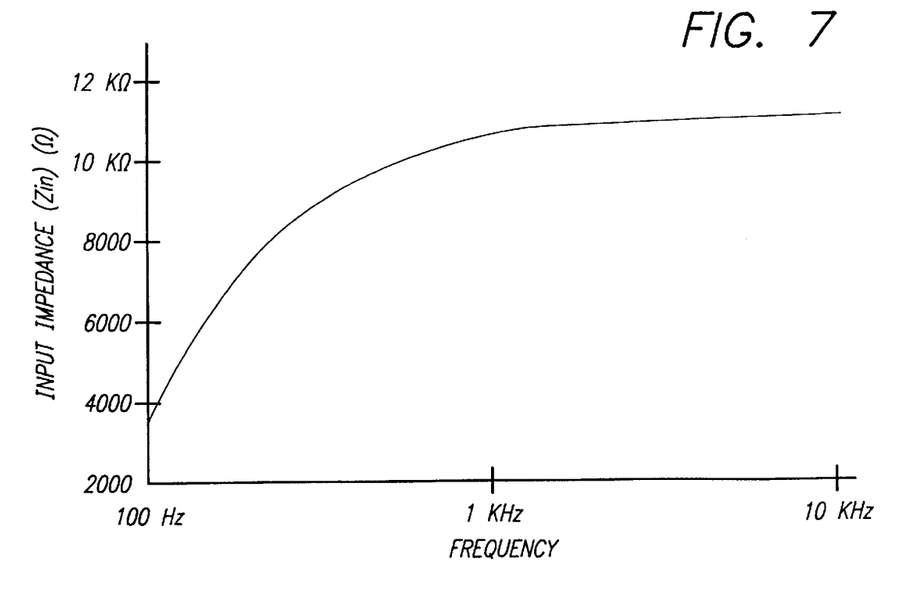
FIG. 7 shows a plot of input impedance versus ANI signal frequency.

FIG. 7 shows a plot of input impedance response with respect to ANI signal frequency during an ANI operation for DAA circuits shown in FIGS. 5 and 6. In FIG. 7, input impedance Zin (assumed to be resistive) looking into the modem from the telephone line ranges from about 3.5 KΩ to 11.5 KΩ depending on the ANI signal frequency. Thus Zin shows an increase of up to 9.2 KΩ when compared to the prior art DAA input impedance shown in FIG. 3.

Figure 8:
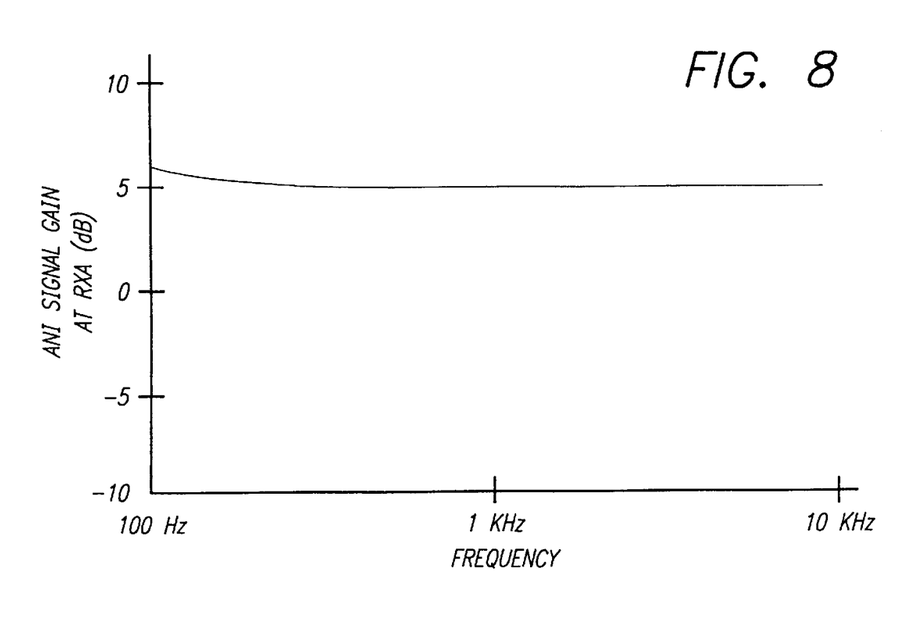
FIG. 8 shows the frequency response of ANI signal gain.

FIG. 8 shows the frequency response of ANI signal gain during an ANI operation for DAA circuits shown in FIGS. 5 and 6. In FIG. 8, the vertical axis shows ANI signal gain in dB at RXA line (pin). In contrast to the prior art DAA circuit performance shown in FIG. 4, the caller ID (ANI) signals arriving at RXA line (pin) suffer virtually no attenuation, and instead show some gain according to FIG. 8. The gain is provided by amplifier A2 acting in an "unbalanced hybrid" mode with switch SW5 opened. In FIG. 8, ANI signal gain at RXA line (pin) in the DAA circuits of the invention is relatively constant at around 6 dB for ANI signal frequency of 100 Hz–10 KHz.

As a result, the invention reduces undesirable caller ID (ANI) signal attenuation and allows a modem to detect the caller ID (ANI) signals in more difficult or noisy circumstances with the addition of only one extra circuit component (switch SW5) to the conventional DAA circuit. The invention allows a cheaper, more compact DAA circuit design and significantly reduces or eliminates undesirable caller ID (ANI) signal attenuation.

Thus, a method and apparatus for implementing a automatic number identification system have been described. It is understood that particular embodiments described herein are illustrative only and should not limit the present invention thereby. The invention is defined by the claims and their full scope of equivalents.

What is claimed is:

1. An apparatus for connecting a data terminal equipment to a telephone line over which ID information is transmitted to said data terminal equipment comprising:
   a first switch coupled to said telephone line;
   a capacitor coupled to said first switch;
   a transformer having a first side and a second side;
   said first side of said transformer coupled to said capacitor;
   said second side of said transformer connected to a transmit line and a receive line for coupling to said data terminal equipment;

means for selectively generating a high impedance characteristic coupled to said second side of said transformer; and a second switch coupled to said first side of said transformer, said second switch moveable between an open position and a closed position, said second switch in its open position when said means for generating a high impedance characteristic generates said high impedance characteristic along said transmit line creating a pathway through said apparatus from said telephone line to said receive line along which said ID information may pass.

2. The apparatus of claim 1 wherein said means for selectively generating a high impedance comprises an amplifier with a shutdown mode.

3. The apparatus of claim 2 wherein said amplifier is positioned along said transmit line and said amplifier when shutdown and said second switch when in said open position creates said pathway through said apparatus along which ID information may pass.

4. The apparatus of claim 1 wherein said means for selectively generating a high impedance comprises a third switch.

5. The apparatus of claim 4 wherein said third switch is positioned along said transmit line and is moveable between an open position and a closed position, and wherein said third switch is moved to said open position along with said second switch to create said pathway through said apparatus along which ID information may pass.

6. The apparatus of claim 1 further comprising a protection circuit coupled to said capacitor.

7. The apparatus of claim 1 further comprising a DC biasing circuit coupled to said capacitor.

8. The apparatus of claim 7 wherein said DC biasing circuit comprises an inductor.

9. The apparatus of claim 1 wherein said second switch in said closed position causes said apparatus to seize said telephone line.

10. A device with automatic number identification capability for identifying an incoming caller ID signal from a telephone line comprising:

a first switch coupled to said telephone line;

a capacitor coupled to said first switch for coupling said incoming caller ID signal;

a transformer having a primary winding and a secondary winding, said primary winding coupled to said capacitor for coupling said incoming caller ID signal;

a receive line coupled to said secondary winding of said transformer; and a high impedance characteristic generating element coupled to said secondary winding of said transformer, said element having a first state wherein said high impedance characteristic is generated and a pathway is established from said telephone line to said secondary winding of said transformer to said receive line having minimal attenuation and said element having a second state wherein said high impedence characteristic is not generated and information is permitted to pass to and from said secondary winding of said transformer from said telephone line.

11. The device of claim 10 including a protection circuit coupled to said first switch.

12. The device of claim 11 including an artificial inductor coupled to said protection circuit.

13. The device of claim 10 wherein said high impedance characteristic generating element comprises an amplifier having a first shutdown state and a second operational state.

14. The device of claim 10 wherein said high impedance characteristic generating element comprises a switch having a first open position and a second closed position.

15. The device of claim 10 wherein said high impedance characteristic generating element comprises an optoelectronic relay.

16. The device of claim 10 further including a second switch coupled to said primary winding.

17. A method of automatic number identification for a data access arrangement that receives an incoming identification signal from a telephone line, said method comprising the steps of:

closing a first switch to couple said incoming identification signal;

coupling said incoming identification signal via a capacitor;

coupling an output of said capacitor via a transformer having a first side and a second side, said first switch and capacitor coupled to said first side and a receive signal line coupled to said second side;

generating a high impedance on said second side of said transformer; and creating a path of minimal attenuation along said received signal line along which said identification signal may pass.

18. The method in accordance with claim 17 including the step of closing a second switch coupled to said first side of said transformer to seize said phone line after said incoming identification signal is received.

19. The method of claim 17 wherein a transmit signal line is coupled to said second side of said transformer and an amplifier is positioned along said transmit signal line and said step of generating a high impedance comprises shutting said amplifier off.

20. The method of claim 17 wherein a transmit signal line is coupled to said second side of said transformer and a second switch is positioned along said transmit signal line and said step of generating a high impedance comprises opening said second switch.

* * * * *